A. SUNDH.
BRAKING APPARATUS.
APPLICATION FILED SEPT. 23, 1905.
1,008,189.
Patented Nov. 7, 1911.
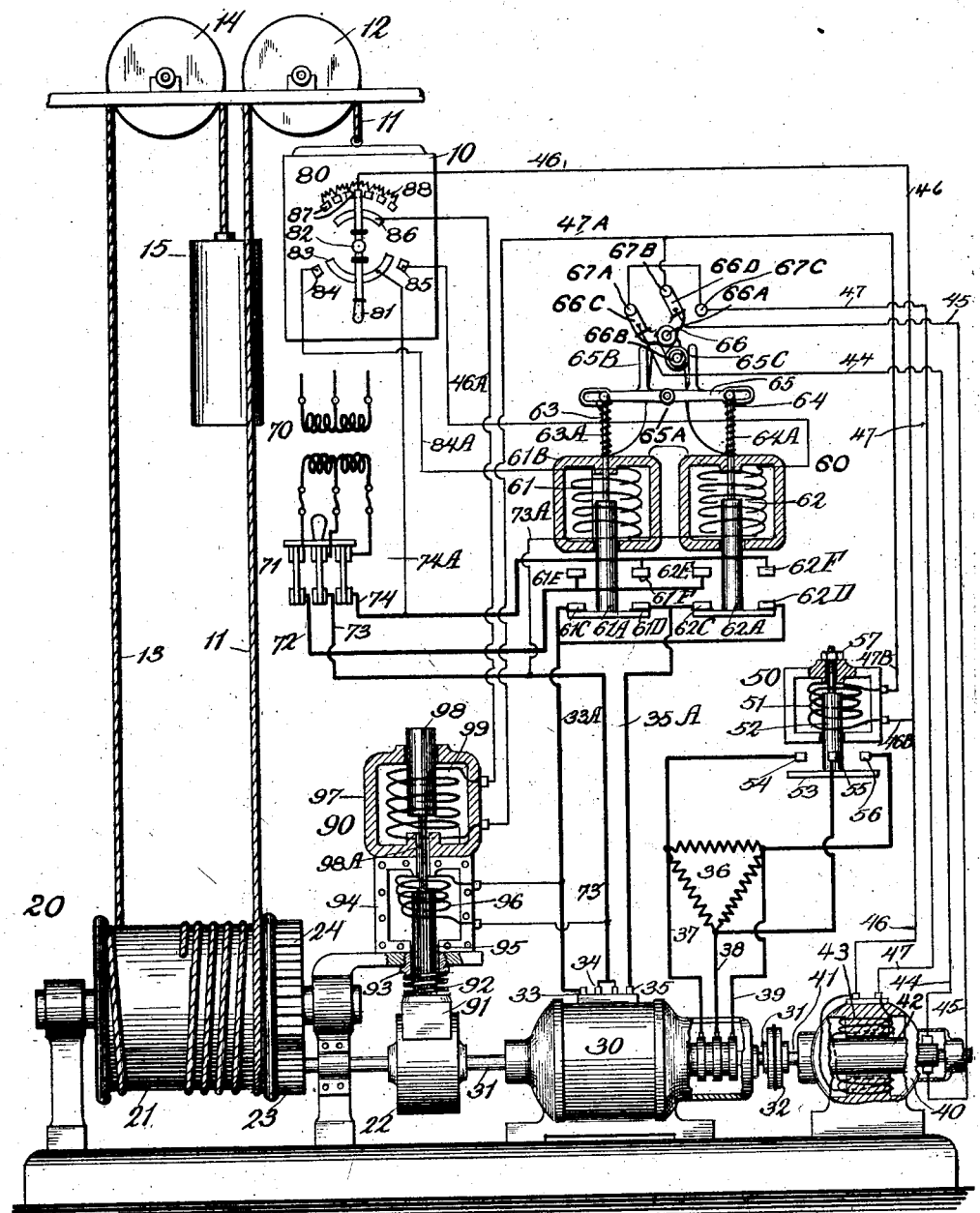
WITNESSES:
Thomas Foster
William Murray
INVENTOR:
August Sundh
BY
E. W. Marshall
ATTORNEY

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

BRAKING APPARATUS.

1,008,189.      Specification of Letters Patent.      Patented Nov. 7, 1911.

Application filed September 23, 1905. Serial No. 279,792.

*To all whom it may concern:*

Be it known that I, AUGUST SUNDH, a citizen of the United States, and a resident of Yonkers, in the county of Westchester and State of New York, have invented certain new and useful Improvements in Braking Apparatus, of which the following is a specification.

My invention relates to a braking arrangement for bringing moving bodies, such as electric motors, to rest.

I will describe my invention in the following specification, and point out the novel features thereof in claims.

The drawing is a diagrammatic representation of an electric elevator system to which my invention is applied.

10 designates an elevator car which is shown connected by a cable 11 to the winding drum 21 of a hoisting apparatus 20. The cable is attached to the car and to the drum, and passes up over a fixed sheave or pulley 12 near the upper limit of the car's travel. A similar cable 13 may be attached to drum 21, but wound in the opposite direction upon it, and be run up and over a sheave or pulley 14, and thence down to a counterweight 15.

The hoisting apparatus 20 comprises a motor 30 to the shaft 31 of which may be attached a brake pulley 22 and a pinion 23, which may be arranged to mesh with a gear 24, which is secured to the winding drum 21. Any other of the many well known means for transmitting the movement of the motor to the elevator car may be used. This constitutes no part of the present invention. The drawing shows the motor as one of the alternating current type, as my invention is applicable with peculiar advantages to this type of motor, but is by no means limited to this type.

40 designates a generator, connected to run with the motor, and arranged to be driven thereby. This may be done by having its shaft 41 directly connected to motor shaft 31 by means of a coupling 32, or in any other desired manner. This generator may be of any desired type. I have shown it as a direct current generator, as this type has many advantages. For example, its generated current may be used to control the motor with direct current apparatus without the use of the more expensive and less efficient alternating current devices. I have shown generator 40 with an armature 42, and a series field 43.

A resistance 36 is shown connected to the rotor of motor 30 by means of three conductors 37, 38 and 39, and slip rings on the motor.

50 designates an electro-responsive device, the purpose of which is to short-circuit resistance 36 when the speed of the motor reaches a predetermined rate. I will describe it more fully later.

60 is an electrically actuated switch for starting the motor in either direction. It also performs other functions, as will be pointed out later.

70 designates a transformer, the primary of which may be connected to a suitable source of alternating, intermittent or pulsating current supply, and the secondary of which after passing through a manually operated main switch 71 may be led by mains 72, 73 and 74 to various parts of the apparatus which I use in carrying out my invention.

At 80 I have shown a manually operated master-switch which may be placed in the elevator car 10, or in any other desired location, and by means of which the movement of the motor and its connected car may be controlled. It comprises a lever 81, which is pivoted at 82. The upper and lower parts of this arm are insulated from each other. The lower part is adapted to electrically connect segmental contact 83 with either stationary contact 84 or stationary contact 85. The upper part of lever 81 is adapted to connect segmental contact 86 with any one of a series of fixed contacts 87, which are connected together through a resistance 88.

At 90 I have shown an electrically actuated brake. It comprises a brake shoe 91, which is arranged to be pressed against brake pulley 22 by its own weight, and the weight of its connected parts, or by the additional pressure of a spring 92, which may be adjusted by a threaded collar 93. This brake may be released by a magnet 94, which is preferably constructed of laminated megnetic material. This magnet has a core 95 of similar material, and a coil or winding 96, the ends of which may be connected, as shown, to two of the conductors 73 and 33<sup>A</sup> which lead to motor 30. Above magent 94 is another magnet 97 which has a core 98 and a winding 99. Core 98 may be connected to core 95 and through the latter to brake shoe 91 by means of a rod 98$^A$. The frame and core of this upper magnet are constructed of magnetic material, but need not be laminated unless arranged to be energized by alternating currents.

I will now trace the various electrical circuits and will describe the operation of my invention. In the diagram the main line circuits or motor circuits are designated by heavy lines, while light lines are used to show the other circuits. It may be seen that segmental contact 83 on the car switch is connected to main 74 by a conductor 74$^A$. Now, if an operator moves pivoted lever 81, so that the lower part of it connects segmental contact 83 with stationary contact 84, a circuit will be closed thereby through conductor 84$^A$, winding 61, which is in the left hand portion of the reversing switch 60 through conductor 73$^A$ to main line conductor 73. The magnet frame 61$^B$ will be energized thereby and will raise its core 61$^A$ and its connected parts. Movable contacts 61$^C$ and 61$^D$ are connected as shown to this core 61$^A$, and when the core is raised they will be brought up against contact 61$^E$ and 61$^F$ respectively. Main line conductor 72 is connected to stationary contact 61$^E$; main line conductor 74 is connected to contact 61$^F$. When the movable contacts 61$^C$ and 61$^D$ are moved up against these stationary contacts, the main line conductors will be connected thereby to the motor terminals; 72 through conductor 33$^A$ to motor terminal 33, and main line conductor 74 through conductor 35$^A$ to motor terminal 35. The central main line conductor 73 is permanently connected to the central motor terminals 34. The mains 72, 73 and 74 will therefore be connected to motor terminals 33, 34 and 35; at the same time the winding 96 of brake magnet 94, which is connected across conductors 73 and 33$^A$ will be energized, and will cause magnet 94 to raise its core 95 and release the brake shoe 91 from the brake pulley 22. The motor will therefore begin to rotate in one direction. The operator may stop the motor by bringing lever 81 back to its central position. This will cut off current from the reversing switch magnet 61, and will allow the movable contacts to drop back away from the stationary contacts above pointed out, and this will cut off the current supply from the motor 30, and from the brake magnet 94, which will cause the motor to come to rest. If the operator had moved the pivoted lever 81 in the opposite direction, so that the lower part of the lever had connected segmental contact 83 with stationary contact 85, the operation would have been similar, but in this case the winding 62 of the reversing switch 60 would have been energized, and would have caused movable contacts 62$^C$ and 62$^D$ to be raised up against stationary contacts 62$^E$ and 62$^F$. This would have caused the main line conductors 72, 73 and 74 to be closed respectively to motor terminals 35, 34 and 33, and the motor would have rotated in the opposite direction. The operation of these parts just described is well known in the art, and I do not claim it as my invention. Directly above the reversing switch 60 is a rocking arm 65, which is pivoted at 65$^A$, the ends of which have a pin and slot connection with rods 63 and 64 secured to the cores 61$^A$ and 62$^A$. Springs 63$^A$ and 64$^A$ may be provided, if desired, to normally hold the rocking lever 65 in its horizontal or central position. The rocking lever 65 carries two cam faces 65$^B$ and 65$^C$, which are arranged to act upon the lower end 66$^B$ of a double pole switch 66, which is pivoted at 66$^A$. This switch has two contact blades 66$^C$ and 66$^D$, which are adapted to rest upon either stationary contacts 67$^A$ and 67$^B$, or 67$^B$ and 67$^C$, respectively. It may be seen that whenever core 61$^A$ is raised, that it will cause the left hand end of rocking arm 65 to be raised. This will bring cam face 65$^B$ against the lower end 66$^B$ of the double pole switch 66, and will cause the switch to assume a position in which it is shown in the drawing, and when the core 61$^A$ is again allowed to drop, the cam face 65$^B$ will be withdrawn from the lower end 66$^B$ of the double pole switch, and will not affect the position of the lever. This operation may be repeated as often as desired without affecting the position of double pole switch 66. If, however, core 62$^A$ is raised, the right hand end of rocking arm 65 will be raised, and this will cause cam face 65$^C$ to push the lower end 66$^B$ of double pole switch 66 over to the left, and will cause the contact blade 66$^C$ to engage the stationary contact 67$^B$ and the contact blade 66$^D$ to engage the stationary contact 67$^C$.

44 and 45 designate the leads from the armature 42 of generator 40, which is connected, as has been shown, to run with the motor 30. These leads 44 and 45 are connected to contact blades 66$^C$ and 66$^D$; the stationary contacts 67$^A$ and 67$^C$ are connected to one side of series field 43 of the generator by a conductor 47. Stationary contact 67$^B$ is connected by conductor 47$^A$ to the lower terminal of winding 99 of magnet 97, the other terminal of which is connected by conductor 46$^A$ to segmental contact 86 on the car switch. The other end of series field 43 is connected by conductor 46 to the central one of fixed contacts 87, and when lever 81 is in central position it is connected thereby through conductor 46$^A$ to the winding 99 of magnet 97.

It may be seen from the above circuits that the double pole switch 66 performs the function of reversing the connections between the armature 42 and the series field 43 of generator 40 whenever the reversing switch 60 is actuated to reverse motor 30. This is for the purpose of insuring the current which is generated by armature 42 flowing always in the same direction through series field 43 regardless of direction of rotation of armature 42.

I have previously shown that brake magnet 94 is arranged to lift its core 95, and to thereby release the brake whenever magnet 94 is energized. Magnet 97 is however arranged to pull its core in a downward direction, and to thereby apply the brake whenever magnet 97 is energized. Now, when the operator brings pivoted lever 81 back to its central position to stop the motor, and to allow magnet 94 to release the brake shoe 91 to effect the application of the same to the brake pulley 22, he at the same time completes a circuit from generator 40 through magnet 97, and the current which generator 40 is generating will tend to increase the pressure of the brake. The voltage of generator 40 will be approximately proportional to the speed of the motor 30, and the extra pressure which is applied to the brake by magnet 97 will therefore also be proportional to the speed of motor 30. As the motor comes to rest, the current generated by generator 40 will gradually decrease, and will therefore gradually decrease the extra pressure on the brake. This is a desirable feature, as it causes the motor to come to a gradual and gentle stop without vibration.

Referring again to the car switch 80, it may be seen that the circuit through magnet winding 99 cannot be closed by the upper portion of lever 81 until the lower portion of lever 81 has been moved off of stationary contact 84, or stationary contact 85. It may also be seen that if the operator moves lever 81 a slight degree, until it has left either stationary contact 84, or stationary contact 85, and has come onto either one of the outside of fixed contacts 87, the circuit through winding 99 will be made through resistance 88, so that the effect of magnet 97 will be reduced thereby. The operator may at will include more or less of this resistance 88 in circuit with winding 99, and may thereby regulate the amount of the pressure produced by magnet 97. The winding 99 of magnet 97 is preferably made of comparatively low resistance, so that when it is connected across the generator 40 it practically short-circuits the generator, and thereby puts a load upon the generator. This in itself will place a load upon the motor 30, which of course will also have a tendency to cause retardation.

At 50 I have shown an electro-magnet, the winding 51 of which is shown connected by conductors 46$^B$ and 47$^B$ to conductors 46 and 47$^A$ respectively. This magnet comprises a core 52, to which is attached a contact plate 53, which is arranged to be raised up against stationary contacts 54, 55 and 56 whenever the winding 51 is sufficiently energized. As this winding is connected across generator 40, it is evident that its operation will depend upon the strength of the generated current, and will actuate its core when the strength of this current has reached a predetermined degree. The time of the action of magnet 50 upon the core 52 may be regulated by means of an adjusting nut 57, which is arranged to set the position of core 52 within the magnet 50.

I have shown that resistance 36 is connected in the rotor circuit of motor 30 by means of conductors 37, 38 and 39. These three conductors are connected respectively with stationary contacts 54, 55 and 56. Now, when contact plate 53 is raised up against stationary contacts 54, 55 and 56, it will short-circuit resistance 36 and allow the motor 30 to take more current from the line, and to consequently increase its speed.

I have shown this invention applied to an elevator driven by an alternating current motor, as it has been difficult heretofore to obtain suitable braking arrangements for this type of mechanism. The invention is however applicable to nearly every type of moving mechanism to which it is desired to apply a brake. My improved braking apparatus may of course be used by itself, or in conjunction with other braking means such as I have described.

A series wound direct current generator has been used to illustrate the invention, but any type of electric generator to which a load may be applied will of course answer the purpose. The invention is not limited to electrically driven mechanism, as any other form of motive power may be used to produce the motion which my brake is adapted to retard or to bring to rest.

What I claim is:

1. The combination with a motor, of a local source of current dependent upon said motor, and a common means for opening the motor circuit and then varying the circuit of said second source of current to cause the latter to act as a brake on the motor.

2. A motor, a generator connected to run with the motor, means for causing the generator to produce a braking effect upon the motor, when power is cut off from the motor, and means for positively regulating said braking effect by hand.

3. A motor, a generator connected to run with the motor, said generator having an armature winding and a field winding arranged to be connected together and to produce a braking effect upon the motor proportional in strength to the speed of the motor when power is cut off from the motor, and means for positively regulating said braking effect by hand.

4. A motor, a generator connected to run with the motor, means for causing the generator to produce an electro-dynamic braking effect upon the motor and additional means for causing the generator to produce a mechanical braking effect upon the motor, when power is cut off from the motor.

5. A motor, a generator connected to run with the motor, means for causing the generator to produce an electro-dynamic braking effect upon the motor and additional means for causing the generator to produce a mechanical braking effect upon the motor, both of said braking effects being proportional in strength to the speed of the motor and operable while the speed of the motor is normal or below normal.

6. A motor, a generator connected to run with the motor, means for applying a braking retarding load to the generator and means for applying said load when the motor is open-circuited to positively apply a mechanical brake to the motor.

7. A motor, a generator connected to run with the motor, manually operated means for applying a retarding load to the generator, and means for applying said load to apply a mechanical brake to the motor, said load and the pressure of said brake being proportional in strength to the speed of the motor.

8. A motor, a generator connected to run with the motor, manually operated means for applying a retarding load to the generator, means for applying said load to apply a mechanical brake to the motor, said load and the pressure of said brake being proportional in strength to the speed of the motor, and manually operated means for decreasing the load and the pressure of the brake.

9. A motor, an electrically actuated brake therefor, a generator connected to run with the motor, a circuit for the brake open during the normal operation of the motor and a manually operated switch arranged to connect said brake circuit to the generator.

10. A motor, an electrically actuated brake therefor, a generator connected to run with the motor, a circuit for the brake, a resistance in said circuit, and a manually operated switch arranged to connect said brake circuit to the generator and to cut more or less of said resistance out of the circuit.

11. The combination with an alternating current motor, of a source of current independent of the motor circuits, and a single means for opening the motor circuits and then varying the circuit of said current at will to cause said source of current to retard the motor.

12. An electric motor, a source of electrical supply connected to the motor, a generator connected to run with the motor, said generator having an armature winding and a field winding, and means for cutting off the electrical supply from the motor and for connecting the armature and field windings of the generator.

13. An electric motor, a brake therefor, a source of electrical supply connected to the motor, a generator connected to run with the motor, and manually operated means for cutting off the electrical supply from the motor, and for connecting the brake to the generator.

14. A source of electrical supply, an electric motor connected to the source of supply, a brake therefor, an electro-magnet arranged to release said brake, said electro-magnet being energized from said source of supply, a second electro-magnet arranged to apply said brake, a generator connected to run with the motor, and means for connecting said second electro-magnet to the generator, when the source of electrical supply is cut off from the motor and the first electro-magnet.

15. An electric motor, a starting switch therefor, a brake having a magnet winding, a generator connected to run with the motor and a manually operated switch having contacts arranged to control the starting switch, and other contacts arranged to connect the brake magnet winding with the generator.

16. An electric motor, a starting switch therefor, a brake having a magnet winding, a generator connected to run with the motor and a manually operated switch having contacts arranged to control the starting switch, and other contacts arranged to connect the brake magnet winding with the generator and to control the current through said winding.

17. A motor, an electrically operated switch therefor, a generator connected to run with the motor, and a hand switch arranged to control the starting switch, and to cause the generator to produce a braking effect upon the motor and to positively regulate said braking effect.

18. A motor, an electrically operated reversing switch therefor, a brake, a generator connected to run with the motor, and a switch arranged to control the reversing switch and to cause the brake to be actuated by current from the generator.

19. An electric motor, an electrically operated reversing switch therefor, a brake having a magnet winding, a source of electrical supply connected to the motor, a generator connected to run with the motor, and a switch arranged to control the reversing switch and to short-circuit the generator through the magnet winding of the brake.

20. The combination with an electric motor, of a generator operated by said motor, starting resistance, means operated by current from said generator for cutting out said starting resistance to effect the acceleration of the motor, and means to cause said generator to materially retard said motor while the latter is being brought to rest.

21. The combination with an electric motor, of sectional starting resistance therefor, electro-magnetic switch apparatus for cutting out one or more sections of said resistance, a local source of current dependent upon the motor, means co-acting with said electro-magnetic switch apparatus for varying the current from said local source, and a single device for controlling both the electro-magnetic switch apparatus and said current-varying means.

22. An alternating current motor, a source of alternating current supply therefor, a brake having a magnet winding, a direct current generator connected to run with the motor, and means for short-circuiting the generator through the brake magnet winding when the current is cut off from the motor.

23. An alternating current motor, a source of alternating current supply therefor, a brake for the motor, an alternating current magnet arranged to release the brake when current is supplied to the motor, a direct current magnet arranged to apply the brake, a direct current generator connected to run with the motor, and means for connecting the generator to the direct current magnet when the current is cut off from the motor.

24. An alternating current motor, a source of alternating current supply therefor, a brake for the motor, an alternating current magnet arranged to release the brake when current is supplied to the motor, means for applying the brake when current is cut off from the motor, a direct current magnet arranged to co-act with said means for applying the brake, a direct current generator connected to run with the motor, and means for connecting the generator to the direct current magnet when the current is cut off from the motor.

25. An alternating current motor, a source of alternating current supply therefor, a brake for the motor, an alternating current magnet arranged to release the brake when current is supplied to the motor, adjustable means for applying the brake when current is cut off from the motor, a direct current magnet arranged to co-act with said means for applying the brake, a direct current generator connected to run with the motor, and means for connecting the generator to the direct current magnet when the current is cut off from the motor, and to cause said direct current magnet to produce an extra pressure on the brake, said pressure being proportional in strength to the speed of the motor.

26. An alternating current motor, a source of alternating current supply therefor, an electrically actuated reversing switch for the motor, a brake, an alternating current magnet arranged to release the brake when current is supplied to the motor, adjustable means for applying the brake when current it cut off from the motor, a direct current magnet arranged to co-act with said means for applying the brake, a direct current generator connected to run with the motor, a manually operated switch arranged to control the reversing switch, and to connect the generator to the direct current magnet when the current is cut off from the motor, to cause said direct current magnet to produce an extra pressure on the brake, said pressure being proportional in strength to the speed of the motor, and means in said manually operated switch for regulating the current in the direct current magnet.

27. The combination with a motor, of a generator operated by the motor, and means for affecting the armature circuit of the generator to apply a braking load to the generator, said means being thus operable only while the motor is disconnected from its source of current supply.

28. The combination with a motor, of a direct current generator operated by the motor, and manually controlled means for controlling the armature circuit of the generator to apply a retarding load to the motor only while the motor is disconnected from its source of current supply, said load being substantially proportional to the speed of the motor.

29. An alternating current motor, an elevator mechanism driven thereby, a source of alternating current supply for the motor, a brake having a magnet winding, a direct current generator connected to run with the motor, and means for short-circuiting the generator through the brake magnet winding to apply the brake when the current is cut off from the motor.

30. An alternating current motor, an elevator mechanism driven thereby, an elevator car connected to said mechanism, a source of alternating current supply for the motor, an electrically actuated reversing switch for the motor, a brake, an alternating current magnet arranged to release the brake when current is supplied to the motor, adjustable means for applying the brake when current is cut off from the motor, a direct current magnet arranged to co-act with said means for applying the brake, a direct current generator connected to run with the motor, a manually operated car switch arranged to control the reversing switch, and to connect the generator to the direct current magnet when the current is cut off from the motor to cause said direct current magnet to produce an extra pressure on the brake, said pressure being proportional in strength to the speed of the motor, and means combined with said manually operated switch for regulating the current in the direct current magnet.

31. A motor, a power supply therefor, an electrically actuated reversing switch for the motor, a brake having a magnet winding, a generator connected to run with the motor, said generator having an armature and a series field, means for connecting the brake magnet winding with the generator when the power supply is cut off from the motor, and means combined with the reversing switch for reversing the connections between the armature and field of the generator when the reversing switch is actuated to reverse the motor.

32. An electric motor, an electrically operated reversing switch therefor, a brake having a magnet winding, a source of electrical supply connected to the motor, a generator connected to run with the motor, said generator having an armature and a series field, a switch arranged to control the reversing switch and to short-circuit the generator through the magnet winding of the brake, and means combined with the reversing switch for reversing the connections between the armature and field of the generator when the reversing switch is actuated to reverse the motor.

33. An electric motor, an electrically actuated switch for starting the motor in either direction, a brake having a magnet winding, a source of electrical supply connected to the motor, a generator connected to run with the motor, said generator having an armature and a series field, and a switch arranged to control the starting switch, and to short-circuit the generator through the magnet winding of the brake, and means combined with the starting switch for reversing the connections between the armature and field of the generator only when the starting switch is actuated to reverse the motor.

34. An alternating current motor, a reversing switch therefor, a source of alternating current supply for the motor, a brake having a magnet winding, a direct current generator connected to run with the motor, said generator having an armature and a series field, and means for short-circuiting the generator through the brake magnet winding when the current is cut off from the motor, and means combined with the reversing switch for reversing the connections between the armature and field of the generator when the reversing switch is actuated to reverse the motor.

35. An alternating current motor, an electrically actuated reversing switch therefor, a source of alternating current supply for the motor, a brake, an alternating current magnet arranged to release the brake when current is supplied to the motor, a direct current magnet arranged to apply the brake, a direct current generator connected to run with the motor, means for connecting the generator to the direct current magnet when the current is cut off from the motor, and means for insuring the current of the generator flowing in the same direction regardless of the direction of its rotation.

36. An alternating current motor, an elevator mechanism driven thereby, an elevator car connected to said mechanism, a source of alternating current supply for the motor, an electrically actuated reversing switch for the motor, a brake, an alternating current magnet arranged to release the brake when current is supplied to the motor, adjustable means for applying the brake when current is cut off from the motor, a direct current magnet arranged to co-act with said means for applying the brake, a direct current generator connected to run with the motor, said generator having an armature and a series field, a manually operated switch in the car arranged to control the reversing switch and to connect the generator to the direct current magnet when current is cut off from the motor, to cause said direct current magnet to produce an extra pressure on the brake, said extra pressure being proportional in strength to the speed of the motor, means in said manually operated car switch for regulating the current in the direct current magnet, and means combined with the reversing switch for changing the connections between the armature and field of the generator when the reversing switch is actuated to reverse the motor.

37. The combination with a motor, of a local source of current dependent upon the motor, and means operable only while the motor is on open circuit for gradually varying the circuit of said second source of current to cause the latter to act as a brake on the motor.

38. The combination with an alternating current motor, of an electric power-consuming device connected thereto, and a single means for successively cutting off the current supply from the motor bringing said device into operation and then increasing its rate of consuming power to effect a slowing down of the motor.

39. The combination with a motor, of a generator having a normally open circuit, a resistance in the circuit, and a single means for successively cutting off the current supply from the motor, closing said circuit and thereby causing the generator to retard the motor, and reducing the resistance in the generator circuit and thereby increasing the retarding action of the generator.

40. The combination with a motor, of a generator connected to be driven by the motor, and a common means for opening the motor circuit and short-circuiting the generator circuit and thereby retarding the motor.

In testimony whereof I have signed my name to this specification in the presence of two subscribing witnesses.

AUGUST SUNDH.

Witnesses:
JOSEPH E. CAVANAUGH,
ERNEST W. MARSHALL.

Copies of this patent may be obtained for five cents each, by addressing the "Commissioner of Patents, Washington, D. C."